(12) United States Patent
Huennekens et al.

(10) Patent No.: US 9,972,148 B2
(45) Date of Patent: May 15, 2018

(54) MOTOR VEHICLE UNLOCKING METHOD AND SYSTEM

(71) Applicant: FORD GLOBAL TECHNOLOGIES, LLC, Dearborn, MI (US)

(72) Inventors: Johannes Huennekens, Ocean Grove (AU); Gregory Foletta, Anakie (AU); Samuel Ellis, Herne Hill (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 14/513,285

(22) Filed: Oct. 14, 2014

(65) Prior Publication Data

US 2015/0102898 A1 Apr. 16, 2015

(30) Foreign Application Priority Data

Oct. 16, 2013 (AU) ................................ 2013903977

(51) Int. Cl.
*G05B 19/00* (2006.01)
*G06F 7/00* (2006.01)
*G07C 9/00* (2006.01)
*B60R 25/24* (2013.01)

(52) U.S. Cl.
CPC .......... *G07C 9/00111* (2013.01); *B60R 25/24* (2013.01); *G07C 9/00174* (2013.01); *G07C 9/0069* (2013.01); *G07C 2209/04* (2013.01)

(58) Field of Classification Search
CPC ............ G07C 9/00111; G07C 9/00174; G07C 9/0069; G07C 2209/04; B60R 25/24

USPC .......... 340/600, 5.6, 572.1–572.9, 10.1–10.6
See application file for complete search history.

(56) References Cited

U.S. PATENT DOCUMENTS

| | | | | |
|---|---|---|---|---|
| 4,455,588 A | * | 6/1984 | Mochida | G07C 9/00682 307/10.4 |
| 4,673,914 A | | 6/1987 | Lee | |
| 4,811,013 A | * | 3/1989 | Akutsu | G07C 9/00309 180/287 |
| 6,072,403 A | | 6/2000 | Iwasaki et al. | |
| 6,441,512 B1 | * | 8/2002 | Jakel | E05B 77/48 307/10.2 |
| 2003/0102958 A1 | * | 6/2003 | Gudmundsson | B60R 25/04 340/5.7 |
| 2003/0216817 A1 | * | 11/2003 | Pudney | E05B 81/78 700/17 |

(Continued)

FOREIGN PATENT DOCUMENTS

| | | |
|---|---|---|
| EP | 1218228 A1 | 7/2002 |
| EP | 1463004 A1 | 9/2004 |
| GB | 2252783 A | 8/1992 |

*Primary Examiner* — Brian Zimmerman
*Assistant Examiner* — Thang Tran
(74) *Attorney, Agent, or Firm* — Frank A. MacKenzie; Brooks Kushman P.C.

(57) ABSTRACT

A key-less entry system for motor vehicle uses actuations of one or more pre-existing vehicle components accessible from outside the vehicle, such as door handles, to generate an unlock an unlock code that is stored in a control unit. The code represents a sequence of actuations of component(s). Upon leaving the vehicle, the user locks the vehicle and sets the code by actuating the components in the desired sequence. To later unlock the vehicle, the user repeats the sequence of actuations, and the control unit sends an unlock signal to one or more door latches.

14 Claims, 3 Drawing Sheets

(56) References Cited

U.S. PATENT DOCUMENTS

| | | | | |
|---|---|---|---|---|
| 2003/0222758 A1* | 12/2003 | Willats | B60R 25/04 | 340/5.72 |
| 2004/0164615 A1* | 8/2004 | Alexandropoulos | B60R 25/24 | 307/10.1 |
| 2005/0040933 A1* | 2/2005 | Huntzicker | G07C 9/00182 | 340/5.64 |
| 2005/0074131 A1* | 4/2005 | McCall | H04R 5/02 | 381/86 |
| 2006/0114101 A1* | 6/2006 | Schambeck | B60R 25/2081 | 340/5.61 |
| 2006/0145825 A1* | 7/2006 | McCall | B60R 25/2045 | 340/426.35 |
| 2007/0276550 A1* | 11/2007 | Desai | B60R 25/23 | 701/1 |
| 2007/0290794 A1* | 12/2007 | Teshima | B60R 25/24 | 340/5.64 |
| 2009/0284358 A1* | 11/2009 | Ieda | E05B 17/10 | 340/425.5 |
| 2010/0085147 A1* | 4/2010 | McCall | B60R 25/246 | 340/5.72 |
| 2010/0305779 A1* | 12/2010 | Hassan | G01C 17/38 | 701/2 |
| 2012/0229253 A1 | 9/2012 | Kolar | | |
| 2013/0099892 A1* | 4/2013 | Tucker | G07C 9/00309 | 340/5.61 |
| 2014/0015637 A1* | 1/2014 | Dassanayake | G07C 9/00174 | 340/5.54 |
| 2014/0232322 A1* | 8/2014 | Kracker | H02J 7/0054 | 320/103 |
| 2014/0285319 A1* | 9/2014 | Khan | G07C 9/00309 | 340/5.61 |
| 2015/0145648 A1* | 5/2015 | Winkelman | G07C 9/00309 | 340/5.72 |

* cited by examiner

MOTOR VEHICLE UNLOCKING METHOD AND SYSTEM

CROSS-REFERENCE TO RELATED APPLICATIONS

This application claims foreign priority benefits under 35 U.S.C. § 119(a)-(d) to AU 2013 903 977 filed Oct. 16, 2013, which is hereby incorporated by reference in its entirety.

TECHNICAL FIELD

The present invention relates to the field of vehicle door locking and/or vehicle access systems and/or methods, and more specifically to the field of "keyless" vehicle unlocking or access systems and methods.

BACKGROUND

If a driver has driven their vehicle to a particular place and then wishes to leave the vehicle, there has been an ongoing issue with what to do with the vehicle keys. The keys can be carried on a person, but this is not always practical. For example, if the vehicle has been driven to a beach and the user wishes to go surfing for example, it is considered impractical to take the vehicles keys into the water or to leave the keys on the beach or nearby the vehicle as the keys may be lost or stolen.

Some prior art systems have designed various keyless systems. It is known for vehicles thus to have keyless entry systems, such as wireless or radio-frequency (RF) systems which transmit a code, which when received by the vehicle will enable a door of the vehicle to be unlocked. Similar systems also apply for the operation of the ignition system for starting the vehicle engine. Examples of these coded wireless unlocking systems are disclosed in EP1218228, US2012/0229253 and U.S. Pat. No. 6,072,403. These systems however do require the user to carry a 'tag' or transmitter rather than a key to enable access to the vehicle. If the tag or transmitter is lost, misplaced or water logged, then access is not possible, just as if the key to the vehicle had been lost or misplaced. Furthermore, the 'code' may be replicated by sophisticated copying software, thus enabling unauthorized access to a vehicle in the event a third party obtained the code.

Other systems also use a keyless entry but without the need for a transmitter. For example the system disclosed in U.S. Pat. No. 4,673,914 provides a keyless entry system for a vehicle wherein a numbered key pad is provided on the exterior of the driver's door for a user to select a numbered combination which sends a coded signal to a control unit which in turn unlocks the door latch. Yet another example is provided in GB2252783, in which there is provided a vehicle door locking system including a door handle lockable door latch, a microswitch responsive to operation of door handle, and an exterior latch release controlled by a central control unit in the vehicle after receiving the correct coded signal from the door latch. The coded signal may be generated in four "digits", each digit corresponding to a number of individual actuations or "pulls" on the door handle. Upon receipt of the correct coded signal, the latch release is caused to unlock. These systems do however require an extra piece of "hardware" to be installed such as the keypad or micro-switches responsive to operation of the door latch. The extra hardware adds to the cost of the vehicle, and may also become damaged over time, and thus rendered unusable.

SUMMARY

An object of the disclosed embodiments is to provide an improved method and/or system of enabling access to a vehicle or unlocking of a vehicle.

A further object of the embodiments described herein to overcome or alleviate at least one of the above noted drawbacks of related art systems or to at least provide a useful alternative to related art systems.

In a first aspect of embodiments described herein there is provided a method of, apparatus and/or system for enabling access to a vehicle, comprising enabling an unlock code sequence to be generated by actuation of at least one pre-existing vehicle component, recording the code sequence in a control unit, and in response to the at least one component generating the code sequence as recognized by the control unit, enabling access to the vehicle.

Other aspects and preferred forms are disclosed in the specification and/or defined in the appended claims, forming a part of the description of the invention.

In essence, the disclosed embodiments stem from the realization that pre-existing vehicle components may be used in order to generate a (preferably customized) unlock code recognizable by the vehicle and which will enable the vehicle to be unlocked, accessed and/or operate certain features of the vehicle, such as the ignition. Complimentary to the pre-existing vehicle components, other components 'added' to the vehicle and/or user specific devices, such as mobile phones, etc. may also be fitted and used, if required.

Advantages provided by the disclosed embodiments comprise the following:

The disclosed embodiments preferably use existing micro switches and/or features of a vehicle—e.g. the trunk lid switch or door handles.

The disclosed embodiments may be incorporated into a vehicle by a manufacturer at a relatively small cost, and provide a significant additional feature useable by vehicle owners.

The disclosed embodiments may alternatively or in combination use various additional inputs such as switches, keypads, vibration sensors, etc. The disclosed embodiments may be enabled/disabled and/or configurable through the vehicle instrument cluster, and this is preferably embedded in the software.

The disclosed embodiments may be incorporated into a vehicle theft prevention feature should the vehicle be "broken into" and the keys inside the vehicle be found.

The disclosed embodiments may provide for a manufacturer configured "master code" should the user-defined unlock code be forgotten or misplaced. Through the interface with the vehicle instrument cluster, a number of codes may be "programmed" into the vehicle.

For instance there may be a temporary unlock code offered to a valet parking attendant and the conditions for the expiry of this code can be user-defined A unique unlock code for the inexperienced users of the vehicle could be defined that restricts some features or, for example, power of the engine. A unique unlock code may allow other people access to the vehicle to put things in and out but prevent them from driving or damaging the vehicle.

Rental cars may have easily renter-programmable codes, with instructions how to do so being displayed on the instrument cluster or Entertainment Command Center (ECC) when the vehicle is keyed off for instance.

The instrument cluster may be programmed so that a master code clears the existing renter-defined codes and protects the future renters.

The disclosed embodiments allow the flexibility to make the "keyless" vehicle a more viable proposition.

The disclosed embodiments are relatively cost effective. Only software development cost is required in the most basic form of implementing the disclosed embodiments.

The disclosed embodiments allow "keyless entry key fob" technology to be used as the user can choose to disable the key fob via the instrument cluster or ECC.

Using existing or added cameras or vibration sensors or microphones on the vehicle it is possible to approach the vehicle, unlock it and open doors or trunk (where powered opening is available) without using your hands.

The disclosed embodiments allow the user to lock the vehicle relatively immediately.

The disclosed embodiments allow the user to check the unlock code, or check his/her correct operation of the code prior to or as the vehicle is locked.

The disclosed embodiments are relatively cost effective. The disclosed embodiments may be developed or refined or customized by vehicle users using OpenNX (or computer code open to general public or vehicle Apps programmers).

The disclosed embodiments may be easy for users to learn and operate. Users not familiar with the presence of the feature will automatically be alerted to its existence, operation and configuration procedures by information displayed on the ECC or the vehicle instrument cluster.

The invention provides backup to other vehicle security systems. For example, in cases where the vehicle is started or operated by recognizing personal features of the user, such as a fingerprint scanner on the engine start button or facial recognition technology of the person in the driver's seat, other users not recognized by the vehicle may be permitted to operate the vehicle by entry of the unlock code. Should the other security unlocking or vehicle operation features of the vehicle fail, they may be overridden by entry of the unlock code.

Further scope of applicability of embodiments of the disclosed embodiments will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
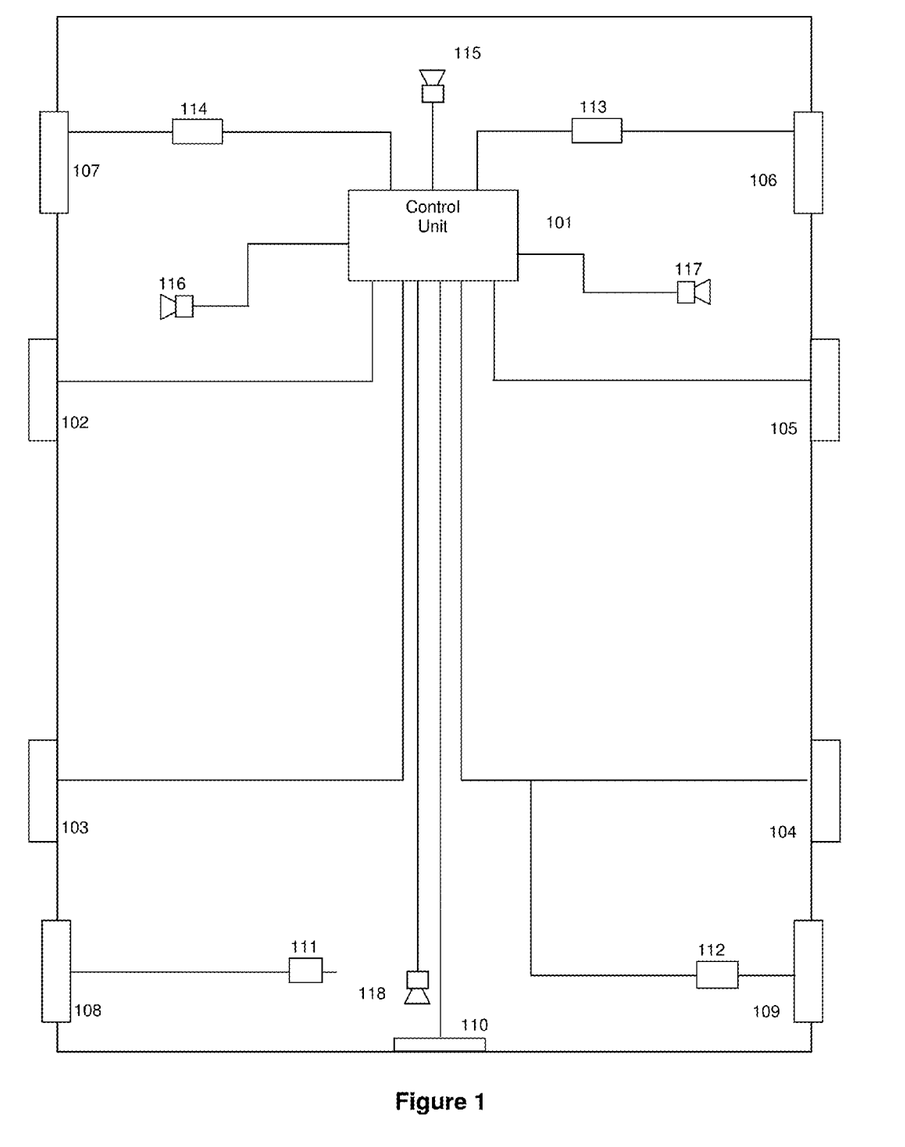
FIG. 1 is a schematic illustration of a vehicle.

With reference to FIG. 1, a vehicle has a number of features or components which are usually provided, such as a control unit 101, door handles 102, 103, 104, 105, wheels 106, 107, 108, 109, trunk latch 110 and/or cameras 115, 116, 117, 118 (for example those associated with driver assistance technology (DAT)). Vibration or other sensors 111, 112, 113, and 114 may also be provided. It is envisaged that other user-specific devices or any existing components of a vehicle may be used in association with the present invention and the scope of the present invention should not be limited to only the components listed above.

In accordance with the present invention, various components (not limited to any particular one or combination of components) may be used to create the unlock code sequence used in the present invention. For example, and without limitation, the vehicle components used, whether solely or in conjunction with other devices, and may include any one or any combination of door handle(s), latch(es), vibration sensor(s), cameras associated with DAT systems; trunk switch(es), door switch(es), body control module (BCM), instrument cluster, vehicle CAN, door locking system, ignition lock/key, wireless locking/unlocking system, and/or other existing sensors on the vehicle.

Keyless operation could be achieved in association with settings of the vehicle and/or via facial recognition technology, voice recognition either inside or outside the vehicle, code sequence(s), recognition of and/or input from a user's personal devices such as mobile phone, etc.

In the case of cameras (for example associated with a DAT system) being used, these cameras are normally used forward, sideways and rearward facing in order to see objects around the car and provide warning. Combining facial recognition technology with these cameras, the vehicle could recognize features of the user and combined with a command (such as a hand motion signal or potentially voice command) to lock or unlock the vehicle. The facial database in the vehicle may be configured using the instrument cluster or entertainment command center (ECC) or could be communicated to the vehicle via a wireless link such as Bluetooth, Wi-Fi, mobile device, internet etc. Once the vehicle recognizes the user, the commands offered to the vehicle could also prepare the vehicle for the user in accordance with a predetermined configuration set by the user and/or factory settings (i.e., starting the air conditioning, lowering the windows, heating the seats, etc.).

The control unit may be adapted to receive a predetermined sequence of actuations of features and/or components. For example, the sequence may be to actuate front right door handle 105 three times, then rear right door handle 104 two times, and then trunk latch 110 once. If this sequence is followed, then the vehicle may be coded to unlock and provide access to the vehicle.

The unlock code sequence may be of any one or any combination of actuations and may also be in association with other functions/software, such as facial recognition and/or other functions/software, and/or in combination with another device and/or proximity item such as a mobile device and/or other item associated with the user. For example, using existing or added cameras and/or vibration sensors and/or microphones on the vehicle it is possible to approach the vehicle, unlock it, and open doors or trunk (where powered opening is available) without using your hands.

The sequence may also be time sensitive, for example, the door actuations may be required to be 1 or 2 seconds apart—the timing, together with the actuation of a particular component being a part of the sequence for unlocking the vehicle. For example, typing of (Morse-type) code such as, without limitation, interval of long and short pulses or number of short pulses followed by little pause and followed by another number of short pulses and so on.

The disclosed system/method may also provide vehicle theft prevention should the vehicle be "broken into" and the keys found inside the vehicle. In this case, the engine immobiliser and/or steering lock and/or handbrake may not be activated until the unlock code sequence is entered correctly. In this case the sequence could also be entered via the ECC or the instrument cluster as the user is already in the vehicle. A person breaking into the vehicle will be unlikely to know the code sequence. An alarm signal may be activated after a predetermined time passing without the sequence being correctly entered upon the vehicle components sensing a user in the vehicle (door being opened, person sitting on a seat, etc.). The sequence entered via the ECC or the instrument cluster could be the same code or a unique one.

The disclosed method/system may also have provision for a manufacturer-configured "master code" should the user-defined sequence be forgotten or misplaced. For instance, if the user is stranded after forgetting the sequence, the user can contact the manufacturer or service representative, and using the master code, the vehicle may be unlocked. If the master code is compromised (i.e. revealed to an unauthorised user) then under manufacturer supervision the master code can be reconfigured/overwritten with a fresh master code.

Through the interface with the instrument cluster a number of unlock codes can be "programmed" into the vehicle.

For instance there may be a 'temporary code' offered to a valet parking attendant and the conditions for the expiry of this code can be user-defined A 'unique code' for inexperienced users of the vehicle could be-defined that restricts some features or say power of the engine. This would allow parents to restrict the power or top speed, for example, of the vehicle without the need for a unique key or additional cost in the vehicle for unique switches. If, for instance, the user wants to prohibit certain other users from starting or operating the vehicle (e.g., a parent leaves children unattended in the vehicle for a short period), then the start button (or other vehicle functions) could be quickly disabled via interaction with the instrument cluster or ECC (i.e., when engine is stopped, instrument cluster provides an option to prevent engine restart until a code is entered via ECC/instrument cluster or other means).

A 'visitor code' may allow other people access to the vehicle to put things in and out but prevent them from driving or damaging the vehicle.

Rental cars may have a 'renter code' which allows for easily programmable renter codes, and instructions how to do so may be displayed on the instrument cluster or ECC when the vehicle is keyed off for instance. The instrument cluster can be programmed so that a master code clears or overwrites the existing renter-defined codes and protects the future renters.

The disclosed system/method allows "keyless entry key fob" technology to be used as the user can choose to disable the key fob via the instrument cluster or ECC.

The disclosed system/method may allow the user to lock the vehicle immediately.

The disclosed system/method may allow the user to check the code, or check his/her correct operation of the code prior to or as the vehicle is locked.

The disclosed system/method may be developed or refined or customised by vehicle users using OpenNX (or computer code open to general public or vehicle Apps programmers).

The disclosed system/method may be easy for users to learn and operate. Users not familiar with the presence of the feature may be automatically alerted to its existence, operation and configuration procedures by information displayed on the ECC or the vehicle instrument cluster.

Figure 2:
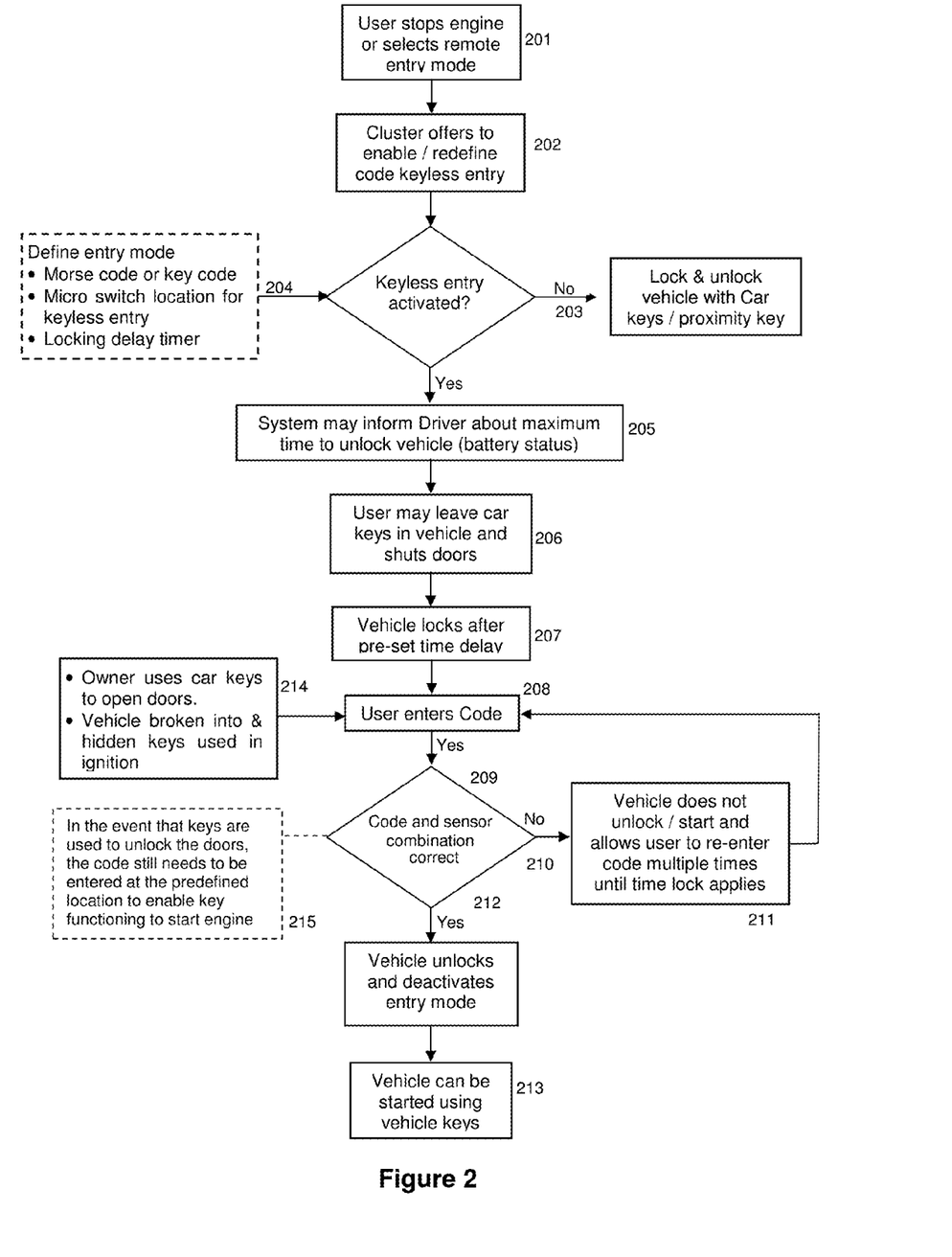
FIG. 2 illustrates a method according to an embodiment the present invention.

FIG. 2, illustrates a flowchart of one method according to a preferred embodiment of the present invention. Preferably, the method begins with the vehicle engine turning 'off' as illustrated at 201. The cluster (or other central control unit) then offers 202 to set or determine a sequence for keyless re-entry to the vehicle. If the method is not activated 203, then the 'normal' vehicle key may be used to gain entry to the vehicle. If the method is selected 204, then the particular sequence may be preselected from a menu (in which a number of 'favorite' sequences are predefined and listed for selection by the user) or individually crafted by the user at that time. Following selection or determination of the sequence, the method may provide confirmation of the sequence (not shown) and/or may notify the user of the time available to return to the vehicle before battery power is drained 205. Once the sequence is determined, and activated, the user may leave the keys inside the vehicle, if desired, and close the doors 206. The vehicle may then lock within the prescribed time 207.

When the vehicle is locked 207, there may be the option of locking the car immediately either using the keys/remote key and/or by entering in the unlock code sequence. The advantage is immediate locking. The advantage of using the sequence may be to confirm to the user that he/she knows the correct code and can correctly input it.

It is also possible that the user may want to carry the key/remote key with them and that the keyless entry via the code is useful when say various occupants of the vehicle split up for example at a shopping center and one of the occupants wants to open the vehicle to drop off some shopping and they do not have a key.

In cases where the vehicle has keyless entry key fobs, when the cluster offers to enable/redefine code keyless entry, it may also provide an option to disable the "keyless entry key fob". This allows the "keyless entry key fob" to be left in the vehicle with the vehicle locked.

When the vehicle is to be unlocked, the user may enter the code sequence 208 via the vehicle features and components as previously defined. The control unit checks that the code and sensor combination is correct 209, for example by virtue of time and number of actuations. If not correct at step 209, the vehicle will not unlock 210. A set number of attempts may be possible 211, after which, if not correct, the vehicle will remain locked until 'overridden' by another suitable means.

If the code sequence is correct, 212, the vehicle unlocks, the user may gain access to the keys 213, and use the vehicle in the normal way. As noted above, code sequence may be of any one or any combination of actuations and may also be in association with other functions/software, such as facial recognition and/or other functions/software, and/or in combination with another device and/or proximity item such as a mobile device and/or other item associated with the user.

This singularly or in any combination may be required to unlock the vehicle. Furthermore, the code and/or associated software/functions may also create the opportunity of a completely keyless vehicle, for example, once the user has unlocked the vehicle using the code, then the vehicle start button is energized and the vehicle can be operated.

The vehicle may be preconfigured to set a 'state' that the vehicle is 'broken into' 214 by virtue of a remote transmitter, door key, and/or the code is not used and/or the vehicle senses that entry has been gained such as via door ajar, switch operating, seat or other sensor, etc. If the 'broken into' state is set, and an unauthorised user finds keys and tries to activate ignition or door lock, the vehicle may request 208 that the authorization code (either via code sequence in the predefined location or via input into the cluster or ECC) be input. If the code is incorrect 210, the code may be again requested and/or the vehicle immobiliser and/or steering lock and/or handbrake is activated i.e. if the keys are in the vehicle and somebody breaks into the car then the engine immobiliser and/or steering lock and/or handbrake is not unlocked until the code is entered. The code entered via the ECC or the cluster may be the same code or a unique one. If the input code is correct 212/213, the vehicle may operate fully.

In the event the keys are used to unlock the vehicle doors 215, the method may still require the vehicle to request 208 that the authorisation code either via code sequence in the predefined location or via input into the cluster or ECC be input.

In the case where the keys are in the vehicle and/or the code is forgotten, then the manufacturer may define a master code unique to that vehicle identification number (VIN) or similar. The master code may be permanently coded into the vehicle, or may be configurable under instructions from the manufacturer when the original permanent code has been compromised.

Figure 3:
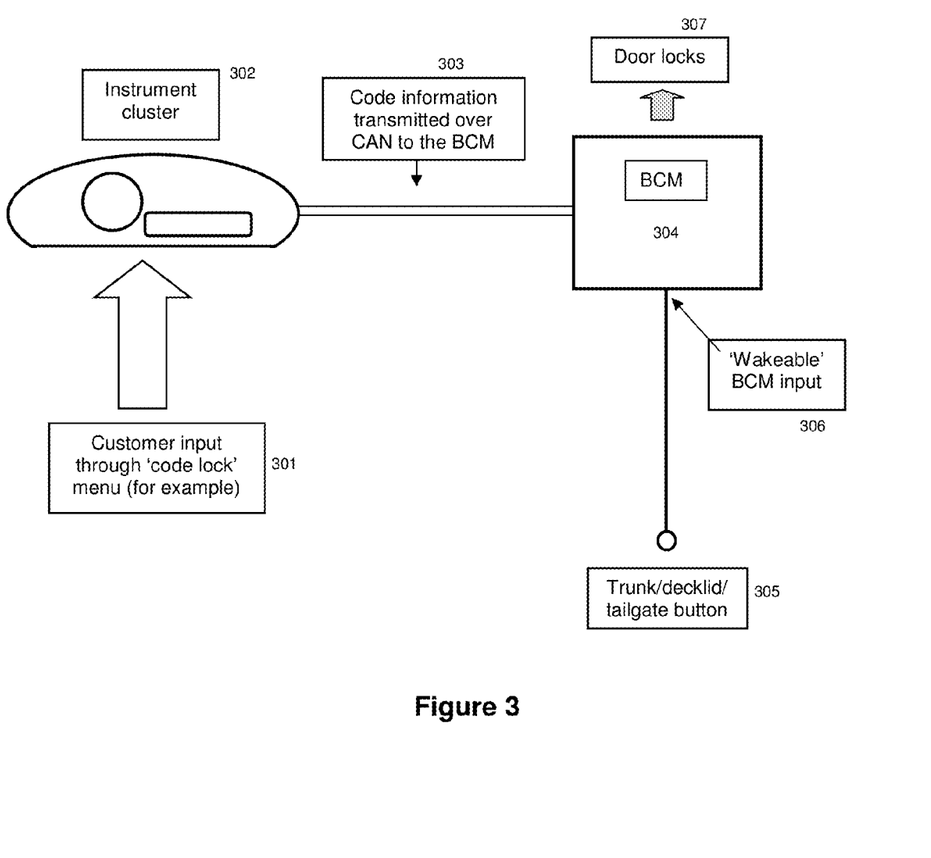
FIG. 3 illustrates another embodiment according to an aspect of the present invention.

Another embodiment is illustrated in FIG. 3. The vehicle electronics may be configured to enable a user to set a code 301 in the cluster 302. The user may then leave the vehicle—perhaps a timer (not shown) may be employed until the vehicle locks. At some point in time after the code is input by the user, the code is transmitted 303 to the Body Control Module (BCM) 304.

If the trunk release button 305 is to be employed in this embodiment, for example, the user may leave their keys in the trunk prior to the vehicle being locked. The trunk release button 305 may be configured to be a "wakeable input" 306. Upon returning to the vehicle, a user may (for example) simply tap out the code (that was input at 301) using gaps in between the short presses on the trunk button for each number. As noted above, for example, typing of a "Morse-type" code such as, without limitation, interval of long and short pulses or number of short pulses followed by little pause and followed by another number of short pulses and so on. The correct code triggers the BCM 304 to unlock one or more locks 307 of the vehicle. The vehicle may additionally be indicated as unlocked with a flash of the indicators and an opening the tailgate, for example.

In the event of tampering, embodiments of the disclosed method/system may be configured to interpret too many tries (input) on the tailgate as a would-be thief and the system may, for example, time-out for a period of time (also definable by the user) of, for example, 30 minutes before another try is accepted. Too many repeated attempts may also trigger alarm conditions and response of the vehicle security system.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

It should also be noted that where a flowchart is used herein to demonstrate various aspects of the invention, it should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Various embodiments of the invention may be embodied in many different forms, including computer program logic for use with a processor (e.g., a microprocessor, microcontroller, digital signal processor, or general purpose computer and for that matter, any commercial processor may be used to implement the embodiments of the invention either as a single processor, serial or parallel set of processors in the system and, as such, examples of commercial processors include, but are not limited to Merced™, Pentium™, Pentium II™, Xeon™, Celeron™, Pentium Pro™, Efficeon™, Athlon™, AMD™ and the like), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an exemplary embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML. Moreover, there are hundreds of available computer languages that may be used to implement embodiments of the invention, among the more common being Ada; Algol; APL; awk; Basic; C; C++; Conol; Delphi; Eiffel; Euphoria; Forth; Fortran; HTML; Icon; Java; Javascript; Lisp; Logo; Mathematica; MatLab; Miranda; Modula-2; Oberon; Pascal; Perl; PL/I; Prolog; Python; Rexx; SAS; Scheme; sed; Simula; Smalltalk; Snobol; SQL; Visual Basic; Visual C++; Linux and XML.) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality where described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL). Hardware logic may also be incorporated into display screens for implementing embodiments of the invention and which may be segmented display screens, analogue display screens, digital display screens, CRTs, LED screens, Plasma screens, liquid crystal diode screen, and the like.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A control method for a vehicle, comprising:
    by a control unit having a user-defined Morse-type unlock code and a visitor code for access but not operation of the vehicle, each of the codes representing a sequence of actuations of an exterior handle,
    unlocking door locks responsive to signals that match the unlock code generated via sequential actuation of the exterior handle without use of a keypad in an absence of an authorized fob in a vicinity of the vehicle, and
    activating an alarm responsive to the signals not matching the unlock code.

2. The method of claim 1, wherein the control unit includes a vehicle instrument cluster.

3. The method of claim 1, wherein the unlocking is further responsive to receiving a signal from a camera or a vibration sensor of the vehicle.

4. The method of claim 1, wherein the unlocking is further responsive to receiving a code entered by a user having access to an interior of the vehicle.

5. A system for a vehicle comprising:
    a control unit
    storing a user-defined Morse-type unlock code representing a sequence of pulls of an exterior handle and a visitor code for access but not operation of the vehicle,
    sending an unlock signal to a door latch upon receiving signals generated without use of a keypad and indicating pulls of the handle that match the unlock code in an absence of an authorized fob in a vicinity of the vehicle, and
    sending an activation signal to an alarm upon receiving signals that do not match the unlock code.

6. The system of claim 5, wherein the control unit comprises a vehicle instrument cluster.

7. The system of claim 5, wherein a user is able to select one of codes that will enable the sending of the unlock signal.

8. The system of claim 5, wherein the sending of the unlock code further requires receipt of a signal from at least one of a camera and a vibration sensor of the vehicle.

9. The system of claim 5, wherein the sending of the unlock code further requires receipt of a second code entered by a user having access to an interior of the vehicle.

10. A motor vehicle system comprising:
a control unit
storing a user-defined Morse-type unlock code and a visitor code for access but not operation of the vehicle, each of the codes representing a sequence of actuations of first and second exterior handles,
sending an unlock signal to a door latch upon receiving signals indicating that the first and second exterior handles have been actuated without use of a keypad and in a manner matching the unlock code in an absence of an authorized fob in a vicinity of the vehicle, and
sending an activation signal to an alarm upon receiving signals that do not match the unlock code.

11. The system of claim 10, wherein the control unit comprises a vehicle instrument cluster.

12. The system of claim 10, wherein a user is able to select one of the codes that will enable sending of the unlock signal.

13. The system of claim 10, further comprising at least one of a camera and a vibration sensor, and wherein the sending of the unlock code further requires receipt of a signal from the at least one camera and vibration sensor.

14. The system of claim 10, further comprising an instrument cluster in an interior of the vehicle, and wherein the sending of the unlock code further requires receipt by the control unit of a second code entered using the instrument cluster.

* * * * *